US009100660B2

(12) United States Patent
Su et al.

(10) Patent No.: US 9,100,660 B2
(45) Date of Patent: Aug. 4, 2015

(54) GUIDED IMAGE UP-SAMPLING IN VIDEO CODING

(75) Inventors: Guan-Ming Su, Fremont, CA (US); Sheng Qu, San Jose, CA (US); Yin Peng, Ithaca, NY (US); Yan Ye, San Diego, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 546 days.

(21) Appl. No.: 13/569,125

(22) Filed: Aug. 7, 2012

(65) Prior Publication Data

US 2013/0039430 A1 Feb. 14, 2013

Related U.S. Application Data

(60) Provisional application No. 61/521,685, filed on Aug. 9, 2011, provisional application No. 61/653,234, filed on May 30, 2012.

(51) Int. Cl.
*H04N 7/12* (2006.01)
*H04N 19/59* (2014.01)
(Continued)

(52) U.S. Cl.
CPC ............. *H04N 19/59* (2014.11); *H04N 19/117* (2014.11); *H04N 19/137* (2014.11); *H04N 19/186* (2014.11); *H04N 19/187* (2014.11);
(Continued)

(58) Field of Classification Search
CPC . H04N 19/117; H04N 19/137; H04N 19/186; H04N 19/187; H04N 19/33; H04N 19/46; H04N 19/59; H04N 19/80; H04N 19/86
See application file for complete search history.

(56) References Cited

U.S. PATENT DOCUMENTS 6,510,242 B1 1/2003 Westerman
7,170,529 B2 1/2007 Chang
(Continued)

FOREIGN PATENT DOCUMENTS

EP 0516320 12/1992
EP 1530830 5/2005
(Continued)

OTHER PUBLICATIONS

Vatis Yet al: "Adaptive Interpolation Filter for H.264/AVC", IEEE Transactions on Circuits and Systems for Video Technology, IEEE Service Center, Piscataway, NJ, US, vol. 19, No. 2, Feb. 1, 2009.*
(Continued)

*Primary Examiner* — Mohammed Rahaman
(74) *Attorney, Agent, or Firm* — Konstantinos Konstantinides

(57) ABSTRACT

An encoder receives a first image of a first spatial resolution and a second image of a second spatial resolution, wherein both the first image and the second image represent the same scene and the second spatial resolution is higher than the first spatial resolution. A filter is selected to up-sample the first image to a third image with a spatial resolution same as the second spatial resolution. The filtering coefficients for the up-sampling filter are computed by minimizing an error measurement (e.g., MSE) between pixel values of the second image and the third image. The computed set of filtering coefficients is signaled to a receiver (e.g., as metadata). A decoder receives the first image (or its approximation) and the metadata, and may up-sample the first image using the same filter and optimally selected filtering coefficients as those derived by the encoder.

14 Claims, 7 Drawing Sheets

(51) Int. Cl.
| | |
|---|---|
| H04N 19/46 | (2014.01) |
| H04N 19/117 | (2014.01) |
| H04N 19/137 | (2014.01) |
| H04N 19/186 | (2014.01) |
| H04N 19/187 | (2014.01) |
| H04N 19/80 | (2014.01) |
| H04N 19/33 | (2014.01) |
| H04N 19/86 | (2014.01) |

(52) U.S. Cl.
CPC .............. *H04N 19/33* (2014.11); *H04N 19/46* (2014.11); *H04N 19/80* (2014.11); *H04N 19/86* (2014.11)

(56) References Cited

U.S. PATENT DOCUMENTS

| | | | |
|---|---|---|---|
| 7,724,949 | B2 | 5/2010 | Chiu |
| 7,912,301 | B2 | 3/2011 | Suzuki |
| 7,933,462 | B2 | 4/2011 | Ward |
| 7,956,930 | B2 | 6/2011 | Sullivan |
| 8,149,336 | B2 | 4/2012 | Mohanty |
| 2005/0259729 | A1* | 11/2005 | Sun ........................ 375/240.1 |
| 2008/0310501 | A1 | 12/2008 | Ward |
| 2008/0317357 | A1 | 12/2008 | Steinberg |
| 2011/0038411 | A1 | 2/2011 | Demos |
| 2012/0294369 | A1 | 11/2012 | Bhagavathy |

FOREIGN PATENT DOCUMENTS

| | | | |
|---|---|---|---|
| EP | 1746839 | | 1/2007 |
| EP | 1746839 A1 * | 1/2007 | ............... H04N 7/26 |
| WO | 2010/105036 | | 9/2010 |
| WO | 2010/104624 | | 10/2010 |
| WO | 2012/027405 | | 3/2012 |

OTHER PUBLICATIONS

Haykin S. "Adaptive Filter Theory, Linear Optimum Filters", Jan. 1, 2002, Adaptive Filter Theory, Upper Saddle River, NJ, Prentice Hall, US, pp. 385-399, Chapter 8.

Vatis Y et al. "Adaptive Interpolation Filter for H.264/AVC", IEEE Transactions on Circuits and Systems for Video Technology, IEEE Service Center, Piscataway, NJ, US, vol. 19, No. 2, Feb. 1, 2009, pp. 179-192.

Fei Zuo et al. "Content-Adaptive Resolution Enhancement of Compressed Video with Encoder-Generated Side Information" Second International Conference on Electrical Engineer, ICEE, 2008, Piscataway, NJ, USA, Mar. 25, 2008, pp. 1-2.

Wittmann S et al. "SEI Message on Post-Filter Hints", JVT Meeting MPEG Meeting, Joint Video Team of ISO/IEC, Oct. 20-27, 2006, pp. 1-8.

European Search Report for Application No. 12178834.3 mailed Mar. 15, 2013.

Sullivan, Gary "Color Format Upconversion for Video Display" JVT-1019 of ISO/IEC MPEG & ITU-T VCEG, 9th meeting: Sep. 2-5, 2003, San Diego.

Gao, Yongying "Report of AhG on Bit-Depth and Chroma Format Scalability" JVT of ISO/IEC MPEG & ITU-T VCEG, 22nd Meeting, Marrakech, Morocco, Jan. 13-19, 2007.

Kim, Woo-Shik, et al. "Inter-Plane Prediction for RGB Video Coding" 2004 International Conference on Image Processing, IEEE, pp. 785-788.

Ying, C., et al. "4:2:0 Chroma Sample Format for Phase Difference Eliminating and Color Space Scalability" JVT of ISO/IEC MPEG & ITU-T VCEG, 15th meeting: Busan, KR Apr. 16-22, 2005.

Danielyan, A. et al, "Cross-Color BM3D Filtering of Noisy Raw Data" Aug. 2009, Dept. of Signal Process, Tampere, Finland.

Ward, Greg "A General Approach to Backwards-Compatible Delivery of High Dynamic Range Images and Video" ACM Siggraph 2008 Classes, published in Aug. 2008 by Association for Computing Machinery.

\* cited by examiner

GUIDED IMAGE UP-SAMPLING IN VIDEO CODING

CROSS-REFERENCE TO RELATED APPLICATIONS

This application claims priority to U.S. Provisional Patent Application No. 61/521,685 filed Aug. 9, 2011 and U.S. Provisional Patent Application No. 61/653,234 filed May 30, 2012, which are hereby incorporated by reference for all purposes.

TECHNOLOGY

The present invention relates generally to images. More particularly, an embodiment of the present invention relates to guided up-sampling of digital images in video coding.

BACKGROUND

As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal vision (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noon-day sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'visual dynamic range' or 'variable dynamic range' (VDR) may individually or interchangeably relate to the DR that is simultaneously perceivable by a HVS. As used herein, VDR may relate to a DR that spans 5-6 orders of magnitude. Thus while perhaps somewhat narrower in relation to true scene referred HDR, VDR nonetheless represents a wide DR breadth. As used herein, the term 'simultaneous dynamic range' may relate to VDR.

Until fairly recently, displays have had a significantly narrower DR than HDR or VDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR), also referred to as a standard dynamic range (SDR), in relation to VDR and HDR.

As with the scalable video coding and HDTV technologies, extending image DR typically involves a bifurcate approach. For example, scene referred HDR content that is captured with a modern HDR capable camera may be used to generate either a VDR version or an SDR version of the content, which may be displayed on either a VDR display or a conventional SDR display. In one approach, generating the SDR version from the captured VDR version may involve applying a global tone mapping operator (TMO) to intensity (e.g., luminance, luma) related pixel values in the HDR content. In a second approach, as described in PCT Application PCT/US2011/048861, filed Aug. 23, 2011, "Extending Image Dynamic Range", by W. Gish et al., generating an SDR image may involve applying an invertible operator (or predictor) on the VDR data. To conserve bandwidth or for other considerations, simultaneous transmission of both the actual captured VDR content and the SDR content may not be a best approach.

Thus, an inverse tone mapping operator (iTMO), inverted in relation to the original TMO, or an inverse operator in relation to the original predictor, may be applied to the SDR content version that was generated, which allows a version of the original VDR content to be predicted. The predicted VDR content version may be compared to generated VDR content. For example, subtracting the predicted VDR version from the original VDR version may generate a residual image. An encoder may send the generated SDR content as a base layer (BL), any residual image as an enhancement layer (EL), and package the iTMO or other predictors or as metadata.

Sending the EL and metadata, with its SDR content, residual and predictors, in a bitstream typically consumes less bandwidth than would be consumed in sending both the HDR and SDR contents directly into the bitstream. Compatible decoders that receive the bitstream sent by the encoder may decode and render the SDR on conventional displays. Compatible decoders however may also use the residual image, the iTMO predictors, or the metadata to compute a predicted version of the HDR content therefrom, for use on more capable displays.

In such layered VDR coding, images may be represented at different spatial resolutions, bit depths, color spaces, and chroma subsampling formats, all of which may force a variety of computer-intensive transformations from a first color format to a second color format.

As used herein, the term "color format" relates to a color representation that comprises two variables: a) a color space variable (for example: RGB, YUV, YCbCr, and the like) and a chroma subsampling variable (for example: 4:4:4, 4:2:0, and the like.) For example, a VDR signal may have an RGB 4:4:4 color format, while an SDR signal may have a YCbCr 4:2:0 color format.

As used herein, the terms "up-sampling" or "up-scaling" relate to the process of transforming one or more color components of an image from one spatial resolution to a second, higher, spatial resolution. For example, a video signal may be up-sampled from a 4:2:0 format to a 4:4:4 format.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
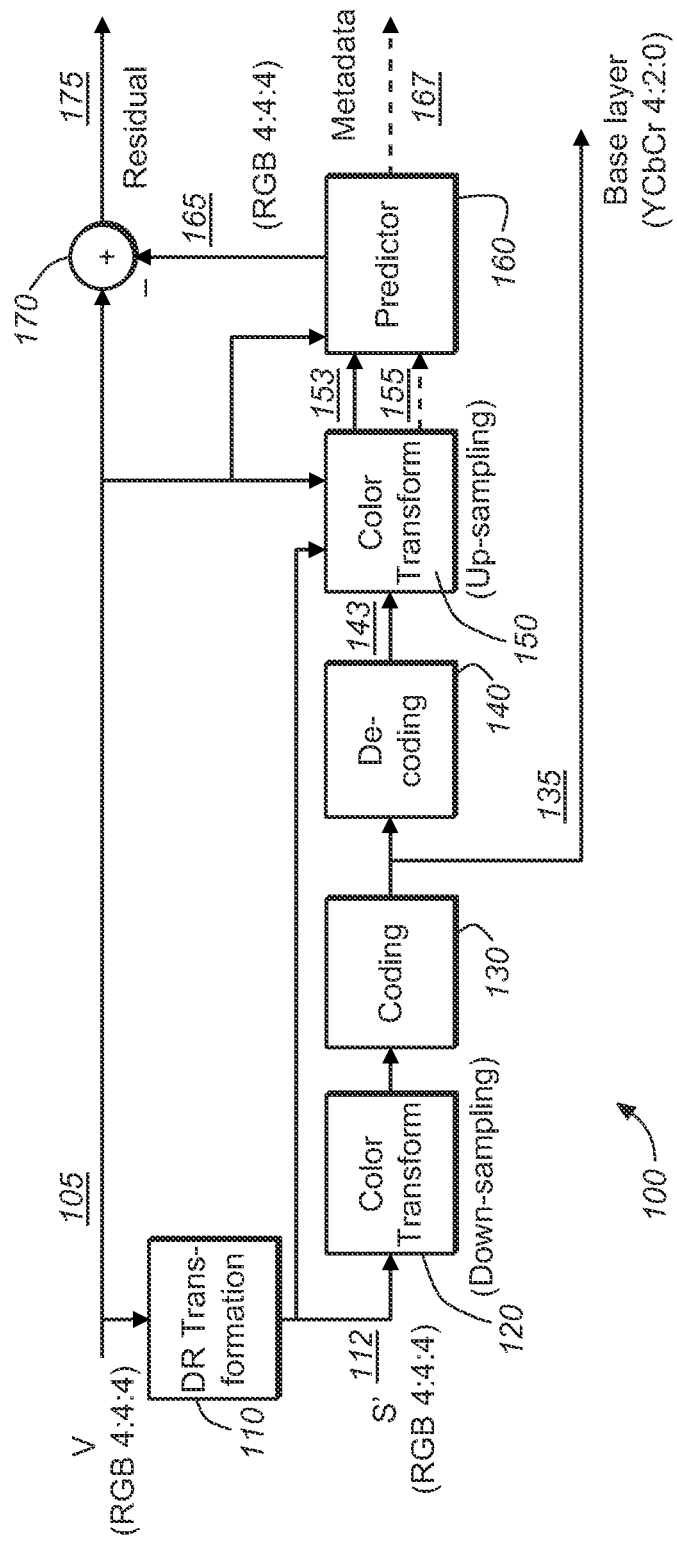
FIG. 1 depicts an example data flow for a layered-coding system according to an embodiment of the present invention.

Guided image up-sampling and color transient improvement filtering in video coding is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the guided image up-sampling and CTI filtering in video coding. An encoder receives a first image of a first spatial resolution and a guide image of a second spatial resolution, wherein both the first image and the guide image represent the same scene and the second spatial resolution is higher than the first spatial resolution. A filter is selected to up-sample the first image to a third image with a spatial resolution same as the second spatial resolution. The filtering coefficients for the up-sampling filter are computed by minimizing an error measurement between pixel values of the guide image and the third image, e.g., the mean square error (MSE). The computed set of filtering coefficients is signaled to a receiver (e.g., as metadata). A decoder receives the metadata and the first image or an approximation of the first image and may up-sample the received image using the same optimized filter and filtering coefficients as those derived by the encoder.

In another embodiment, an encoder receives a target image to be encoded, the target image comprising a first target color component image and a second target color component image. The image is encoded and decoded to generate a coded image and a decoded image, the decoded image comprising a decoded first color component image and a decoded second color component image. A color transient improvement (CTI) filter is selected to filter pixels of the decoded second color component image to generate an output color component image. The CTI filtering coefficients for the CTI filter are computed based, at least in part, by minimizing an error measurement between pixel values of the output color component image and corresponding pixel values of the second color component image in the target image. The CTI filtering coefficients are signaled to a receiver (e.g., as metadata). A decoder receives the metadata and the coded image. After decoding the coded image it may filter the decoded image using the same CTI filtering coefficients as those derived by the encoder.

Example Systems with Guided Image Up-Sampling

Image down-sampling and up-sampling transformations play a key role in video coding since they affect not only coding efficiency but also overall image quality. Improper spatial-scaling transformations may lead to false colors, especially along the edges of an image. Unlike traditional "blind" image up-sampling techniques, wherein given an input image with a sub-sampled color component (e.g., the chroma in YCbCr 4:2:0 format) the color component is up-sampled using only available information within the image itself, embodiments of this invention may utilize information from other images in the video processing pipeline as well.

FIG. 1 depicts an example image processing system 100 implementing guided image up-sampling according to an embodiment of this invention. System 100 represents an embodiment of a layered encoder, wherein input signal V 105 is coded using two layers: a base layer 135 and an enhancement or residual layer 175.

In an embodiment, input signal V 105 may represent an input VDR signal represented by 16 or more bits per color component in an 4:4:4 color format, e.g., RGB 4:4:4. This VDR signal may be processed by a dynamic range reduction process 110 to generate signal S' 112. Signal S' may be in the same or lower spatial resolution than signal V. Signal S' may be represented in a lower bit-depth resolution than V, e.g., 12 bits per color component. Signal S' may be in the same color format as V, or in other embodiments, it may be in a different color format.

In an embodiment, coding 130 may be preceded by color transformation 120, wherein S' may be transformed to another color format, e.g., YCbCr. Transformation 120 may also incorporate sub-sampling of one or more color components, e.g., from 4:4:4 to 4:2:0. Coded signal 135 may be transmitted as a base layer. In an embodiment, coding 130 may be implemented by any of the existing video encoders, such as an MPEG-2 or MPEG-4 video encoder, as specified by the motion pictures expert group (MPEG) specifications.

An enhancement layer 175 may be generated by decoding signal 135, generating a predicted value of the original VDR signal V (165), and subtracting the original V (105) from its predicted value (165) to generate a residual signal 175. In an embodiment, predictor 160 may be implemented using multivariate multiple-regression models as described in PCT application PCT/US2012/033605, filed Apr. 13, 2012, by G-M Su et al. Since the coded signal 135 and the input signal 105 are in different color formats and resolutions, color transform process 150 transforms the output of the decoder 140 into a color format and resolution that matches the color format and resolution of input V 105. For example, unit 150 may transform input data 143 from YCbCr 4:2:0 to RGB 4:4:4.

In traditional up-sampling methods, up-sampled output 153 may be derived solely based on sub-sampled input 143 and an interpolation filter with fixed filtering coefficients. In contrast, in an embodiment, the up-sampling process in 150 may perform up-sampling utilizing data from both the sub-sampled input 143 and data with known full spatial resolution, e.g., inputs S' 112 or V 105. In an embodiment, this guided image up-sampling processing 150 may signal up-sampling related parameters, such as interpolation filtering coefficients, to the rest of the system pipeline (e.g., as metadata signals 155 or 167).

As defined herein, the term "metadata" may relate to any auxiliary information that is transmitted as part of the coded bitstream and assists a decoder to render a decoded image. Such metadata may include, but are not limited to, information as: color space or gamut information, dynamic range information, tone mapping information, or other predictor, up-scaling, and quantizer operators, such as those described herein.

In an embodiment, the filter coefficients used in converting YCbCr 4:2:0 data to YCbCr 4:4:4 data are estimated by minimizing an error metric (e.g., the mean square error (MSE)) between the predicted up-sampled values (e.g., the output 153 of the color transformation 150) and an input guide image at full spatial resolution (e.g., S' 112 or V 105). The same filters may also be applied during the up-sampling process in the decoder.

Figure 2:
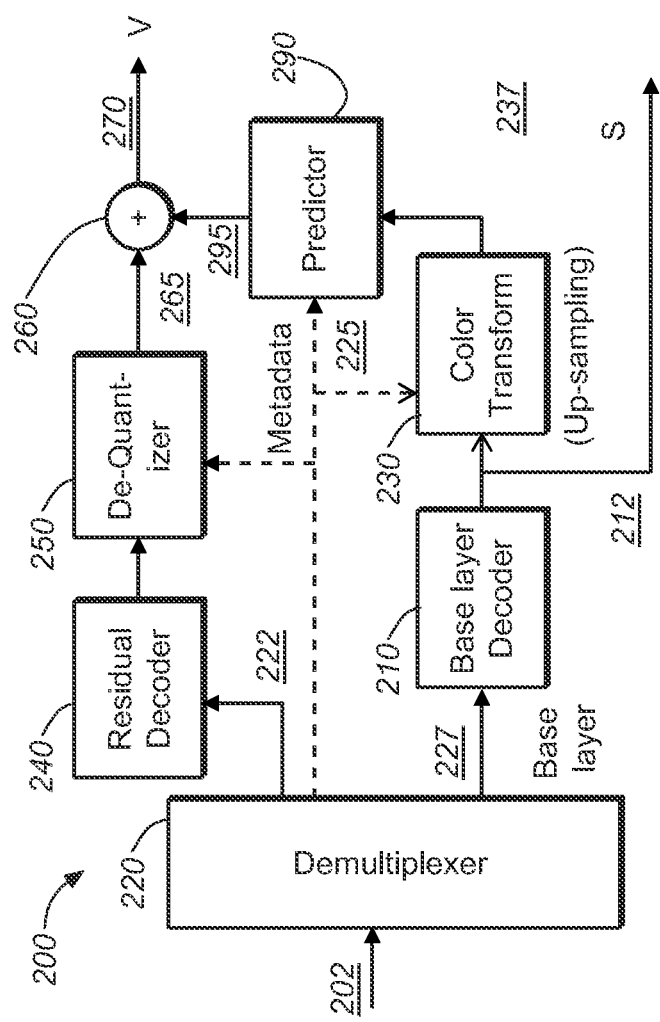
FIG. 2 depicts an example layered decoding system according to an embodiment of the present invention.

FIG. 2 depicts an example implementation of a layered video decoder according to an embodiment. Decoding system 200 receives a coded bit-stream 202 that comprises a base layer 227, an enhancement layer (or residual) 222, and metadata 225, which are extracted following demultiplexing 220. For example, in a VDR-SDR system, the base layer 227 may represent the SDR representation of the coded signal and the metadata 225 may include information related to the prediction (160) and color transform operations (150) used in the encoder. Encoded base layer 227 may be decoded using base layer decoder 210 to output decoder SDR signal S 212. Encoded residual 222 may be decoded (240), de-quantized (250), and added to the output 295 of the predictor 290 to generate the output VDR signal V 270.

Color transform unit 230 may incorporate up-sampling (e.g., from 4:2:0 to 4:4:4). The up-sampling processor in 230, instead of using "blind" up-sampling techniques that rely only on input data 212, may also extract and apply the up-sampling-related parameters (e.g., interpolation filter coefficients) signaled by an encoder using metadata 225 (or 155). Such guided up-sampling during decoding may yield video signals with improved visual quality at no extra computational cost.

Figure 3:
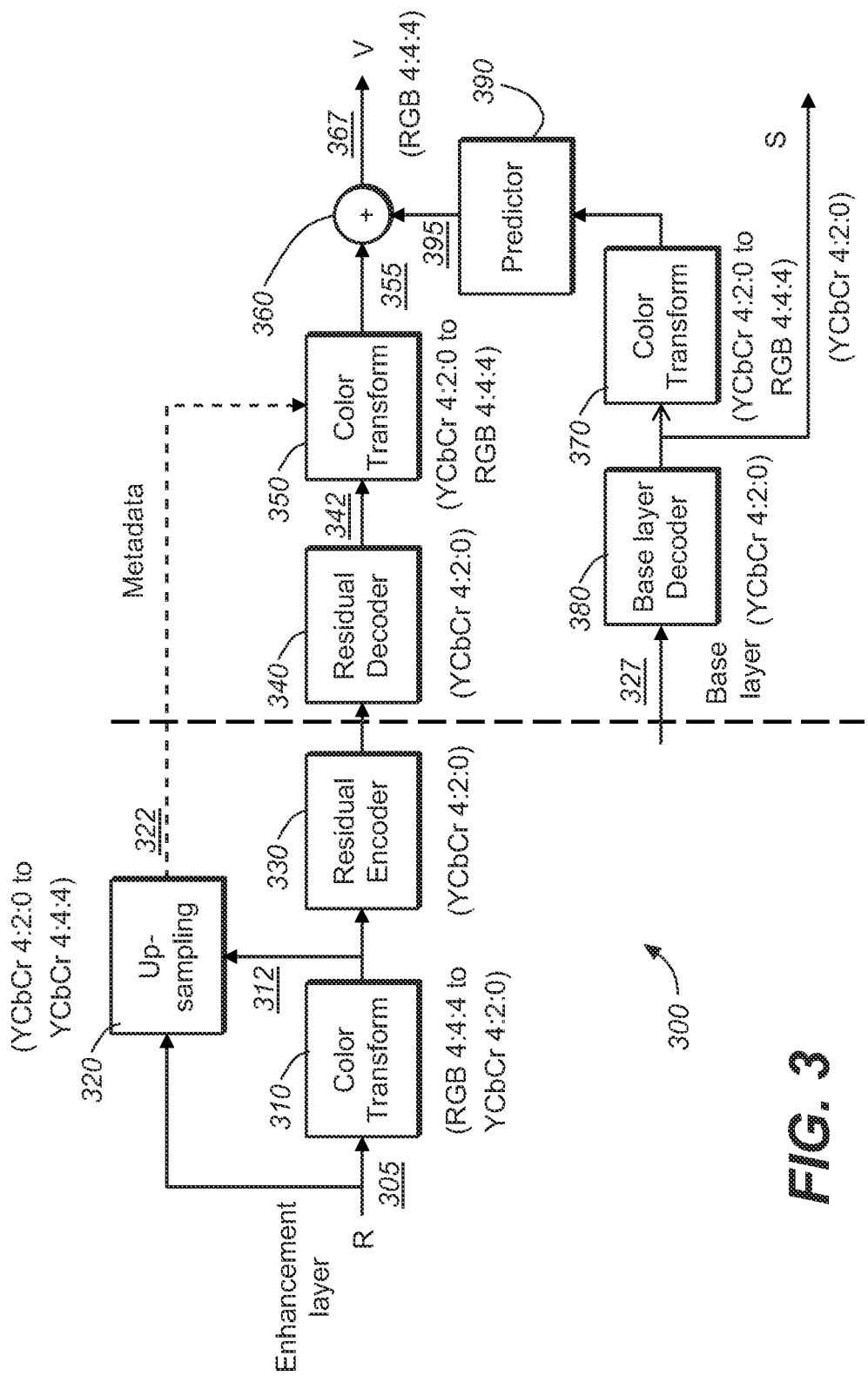
FIG. 3 depicts an example of guided image up-sampling in coding the residual signal in a layered codec according to an embodiment of the present invention.

Guided image up-sampling techniques may be applied to other processing steps in a video coding pipeline as well. FIG. 3 depicts a coding-decoding system of the residual layer in layered coding implemented according to an embodiment of this invention. Residual signal R 305 (175) may be in RGB 4:4:4 color format. Residual encoding 330 (e.g., using an MPEG-4 video encoder), which typically operates in the YCbCr 4:2:0 format, is preceded by color transform unit 310, wherein input 305 may be color transformed and down-sampled to YCbCr 4:2:0. In parallel, up-sampling processor 320 may be guided by input R 305 to compute optimized up-sampling filtering coefficients according to an embodiment of this invention. These filtering coefficients may be signaled to a decoder, e.g., using metadata 322. On the receiver, color transform unit 350 may extract the optimized up-sampling filtering coefficients from metadata 322 and apply them during the process of up-sampling the decoded YCbCr 4:2:0 data 342 to RGB 4:4:4 data 355.

Figure 4:
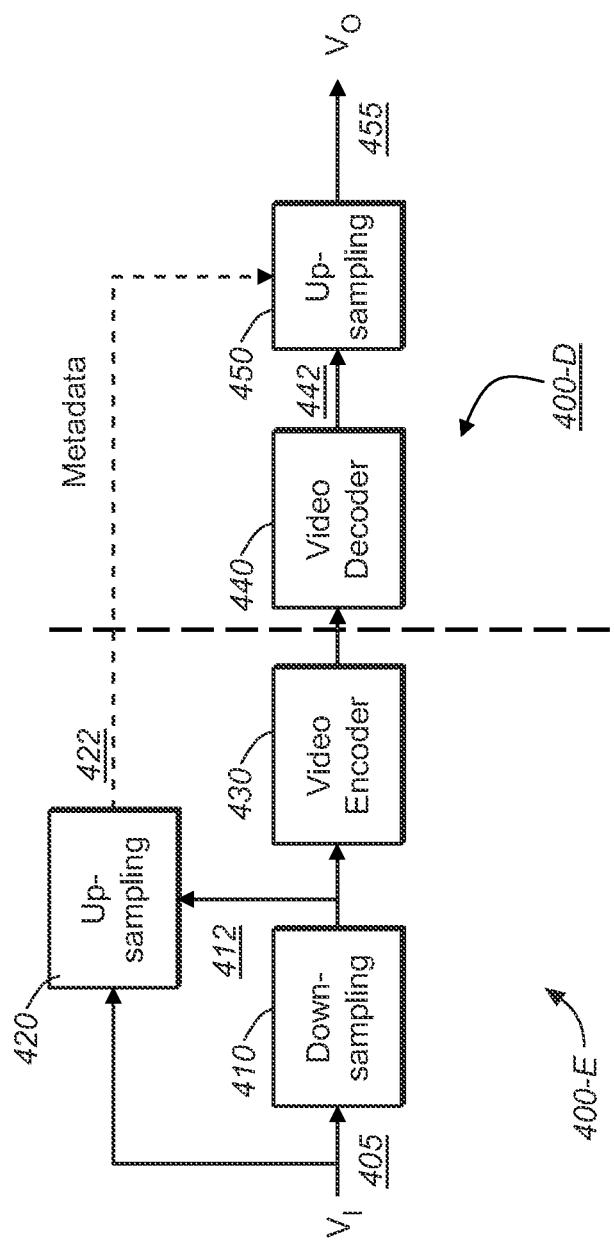
FIG. 4 depicts an example single-layer video coding system according to an embodiment of the present invention.

FIG. 4 depicts an example single-layer video coding system according to an embodiment of the present invention. As depicted in FIG. 4, at least one color component of input signal $V_I$ 405 may be down-sampled by processor 410. The down-sampled output 412 is encoded by video encoder 430 (e.g., an MPEG-4 encoder) and transmitted to a receiver (400-D) comprising video decoder 440 (e.g., an MPEG-4 decoder) and up-sampling processor 450. On the encoder (400-E), up-sampling unit 420 may perform guided up-sampling according to methods described in an embodiment of this invention and may derive optimized up-sampling filtering coefficients using information from both the full-resolution input $V_I$ 405 and the sub-sampled signal 412. The optimized filter coefficients may be signaled to the decoder (400-D), e.g., using metadata 422. Hence, the output 442 of the video decoder (430) may be up-sampled in processing unit 450 using the same set of optimized coefficients as those generated by up-sampling unit 420.

Filter Design for Guided Image Up-Sampling

General 2D Non-Separable Filters

For simplicity and without loss of generality, given an input image comprising multiple color components (e.g., YCbCr or RGB), we consider the guided image up-sampling process of a single color component (e.g., Cb or R). Methods described herein may be repeated as needed for any of the image color components requiring up-sampling.

Figure 5:
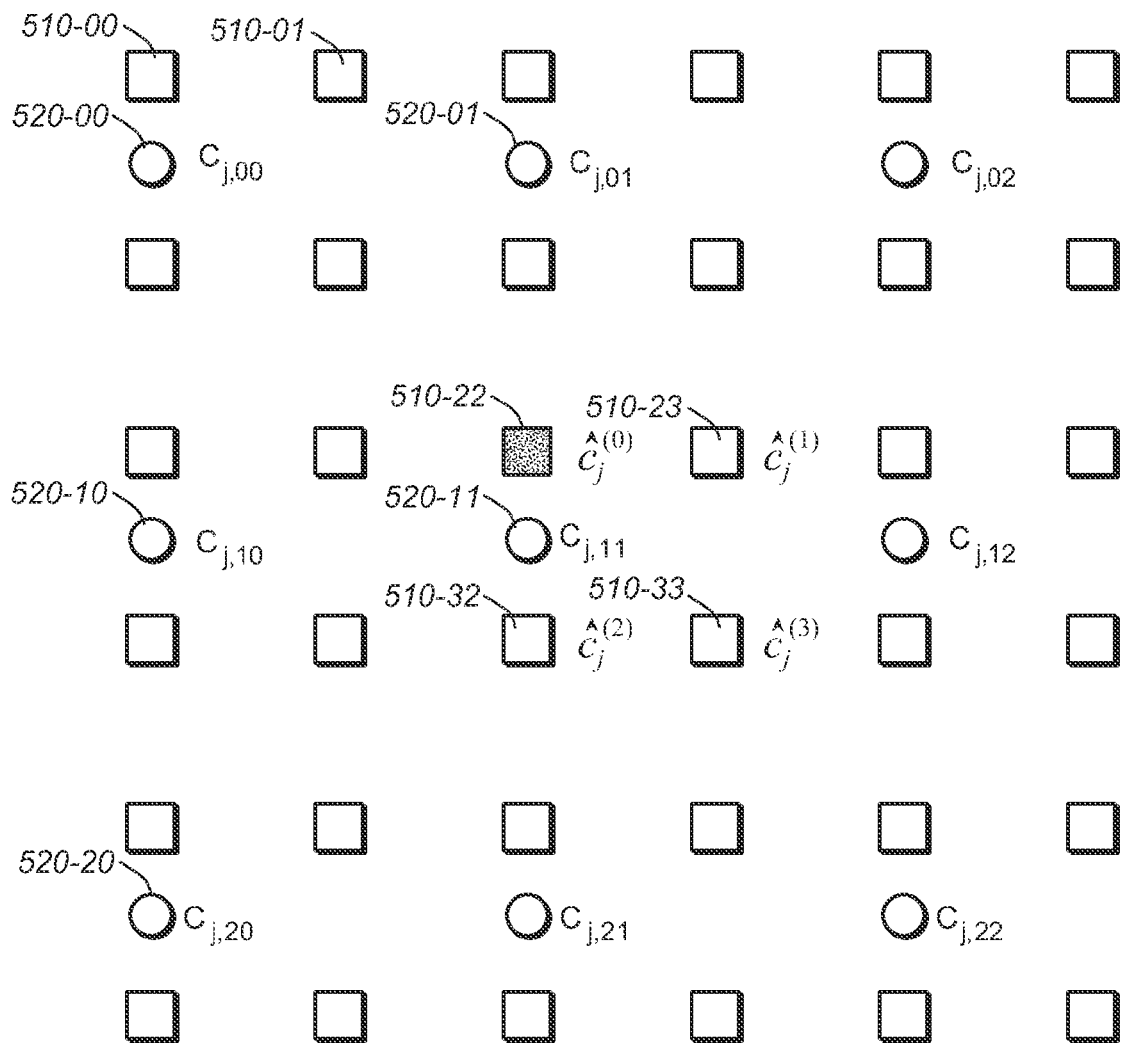
FIG. 5 depicts example input and output pixel arrays for up-sampling by a factor of two using a 2D filter according to an embodiment of the present invention.

In an example embodiment for up-sampling by a factor of two using a 2D interpolation or up-sampling filter, FIG. 5 depicts a 3×3 array of known input pixels, denoted as circles 520, to be up-sampled by a factor of two and thus generate an array of 6×6 pixels, depicted as squares 510. Denote as $c_j$ the input pixels and as $\hat{c}_j$ the predicted or up-sampled pixels, then four new estimated pixels (e.g., 510-22, 510-23, 510-32, and 510-33) are generated for each input pixel (e.g., 520-11). In an embodiment, the up-sampling process may be expressed as a non-separable finite impulse response (FIR) filter:

$$\hat{c}_j^{(i)} = \sum_{x=0}^{2} \sum_{y=0}^{2} m_{xy}^{(i)} \cdot c_{j,xy}, \text{ for } i = 0, 1, 2, 3, \quad (1)$$

where $m_{xy}^{(i)}$ (for x and y from 0 to 2) denote the filtering coefficients. For example, in FIG. 5, $\hat{c}_j^{(0)}$ is denoted as the square 510-22.

Consider now a guide image D at the same target resolution as the output of the up-sampling process, with pixel data denoted herein as $d_j^{(i)}$. For example, as depicted in FIG. 4, the guide image may be a color component of the input image $V_I$ 405. The problem of deriving the filter coefficients $m_{xy}^{(i)}$ may be expressed as an error minimization problem. In an embodiment, filter coefficients are generated so that the minimum mean square error (MSE) between the guide pixel data and the predicted up-sampled pixel data is minimized. This can be formulated as:

$$\min_{\{m_{xy}^{(i)}\}} \sum_{i=0}^{3} \sum_{j}^{p-1} |\hat{c}_j^{(i)} - d_j^{(i)}|^2, \quad (2)$$

where p denotes the total output pixels in the up-sampled image. For example, if the output up-sampled image has a resolution of m rows and n columns, then for each color component p=mn.

Equation (2) can be solved using a variety of known numerical techniques, such as those described in "Applied Multivariate Statistical Analysis," by R. A. Johnson, and D. W. Wichern, 5th Edition, Prentice Hall, 2001. In an example embodiment, denote as $$M = \begin{bmatrix} m_{00}^{(0)} & m_{00}^{(1)} & m_{00}^{(2)} & m_{00}^{(3)} \\ m_{01}^{(0)} & m_{01}^{(1)} & m_{01}^{(2)} & m_{01}^{(3)} \\ m_{02}^{(0)} & m_{02}^{(1)} & m_{02}^{(2)} & m_{02}^{(3)} \\ m_{10}^{(0)} & m_{10}^{(1)} & m_{10}^{(2)} & m_{10}^{(3)} \\ m_{11}^{(0)} & m_{11}^{(1)} & m_{11}^{(2)} & m_{11}^{(3)} \\ m_{12}^{(0)} & m_{12}^{(1)} & m_{12}^{(2)} & m_{12}^{(3)} \\ m_{20}^{(0)} & m_{20}^{(1)} & m_{20}^{(2)} & m_{20}^{(3)} \\ m_{21}^{(0)} & m_{21}^{(1)} & m_{21}^{(2)} & m_{21}^{(3)} \\ m_{22}^{(0)} & m_{22}^{(1)} & m_{22}^{(2)} & m_{22}^{(3)} \end{bmatrix} \quad (3)$$

the filtering coefficients.

For a 3×3 filter, given input pixel data vector (520)

$$c_j = [c_{j,00} c_{j,01} c_{j,02} c_{j,10} c_{j,11} c_{j,12} c_{j,20} c_{j,21} c_{j,22}], \quad (4)$$

a p×9 matrix C may be formed from the input sub-sampled data as $$C = \begin{bmatrix} c_0 \\ c_1 \\ \vdots \\ c_{p-1} \end{bmatrix}. \quad (5)$$

Similarly, a p×4 guiding-data matrix R may be formed as $$R = \begin{bmatrix} r_0 \\ r_1 \\ \vdots \\ r_{p-1} \end{bmatrix}, \quad (6)$$

where $$r_j = [d_j^{(0)} d_j^{(1)} d_j^{(2)} d_j^{(3)}], j = 0, 1, \ldots, p-1. \quad (7)$$

Then, the estimated (up-sampled) pixels may be expressed as $$\hat{R} = \begin{bmatrix} \hat{r}_0 \\ \hat{r}_1 \\ \vdots \\ \hat{r}_{p-1} \end{bmatrix}, \quad (8)$$

where $$\hat{r}_j = [\hat{c}_j^{(0)} \hat{c}_j^{(1)} \hat{c}_j^{(2)} \hat{c}_j^{(3)}], j = 0, 1, \ldots, p-1. \quad (9)$$

From equations (1-9), the estimated pixels can be expressed as $$\hat{R} = CM. \quad (10)$$

In an embodiment, the optimization goal is to minimize the estimated error between the guide input data and the estimated output up-sampled data, which from equation (2), can be expressed as:

$$\min_M \|R - \hat{R}\|^2. \quad (11)$$

A solution, optimum in the least squares sense, may be obtained via $$M = (C^T C)^{-1} C^T R. \quad (12)$$

From equation (3), for each color component to be up-sampled (e.g., Cb and Cr), this embodiment may compute 4*9=36 coefficients which may be signaled to the decoder using metadata or other means. The set of filter coefficients (M) can be updated as needed. In some embodiments, for a given color component, M may be computed once for each frame. In other embodiments, M may be updated on a per image region basis. In some other embodiments, M may be updated on a per scene basis. In other embodiments, M values computed for one color component (e.g., Cb) may be applied to other color components of the same image as well (e.g., Cr).

Regarding the embodiment of FIG. 1, up-sampling in color transform unit 150 may use as guide image R pixels from either input image S' 112 or input image V 105.

As depicted in FIG. 5 and denoted in equation (1), an embodiment of 1:2 pixel up-sampling filtering utilizes a 3×3 2D filter. The methods described herein can easily be extended to support other filter sizes, e.g., 2×2, 5×5, 7×7, and the like, and other up-sampling ratios (e.g., 1:3, 1:4, and the like). The methods are also applicable to simpler, 1D filters. In an embodiment, in equations (1) and (3), a 3-tap 1D filter can be defined by setting $m_{0y}^{(i)} = 0$ and $m_{2y}^{(i)} = 0$ and solving only for $m_{1y}^{(i)}$ (for y=0, 1, and 2).

Symmetric 2D Non-Separable Filters

In equation (1), each up-sampled image pixel is predicted using its own set of filtering coefficients. To reduce the number of coefficients that need to be signaled to a decoder, the total number of filter coefficients may be reduced by sharing filter coefficients across up-sampled pixels. In an example embodiment, even and odd rows of the up-sampled image data may be estimated using the same filter coefficients.

Returning to FIG. 5, in an embodiment, the up-sampling process may be formulated as follows. For each input sample, $c_j$, two samples ($\hat{c}_j^{(0)}$, $\hat{c}_j^{(1)}$) (510-22 and 510-23) are estimated in an odd row and two samples ($\hat{c}_j^{(2)}$, $\hat{c}_j^{(3)}$) (510-32 and 510-33) are estimated in an even row. For each up-sampled pixel, the up-sampling process may be expressed using two 2D FIR filters that share their filtering coefficients:

$$\hat{c}_j^{(i)} = \sum_{y=0}^{2} m_{0y}^{(i)} \cdot c_{j,0y} + \sum_{y=0}^{2} m_{1y}^{(i)} \cdot c_{j,1y} + \sum_{y=0}^{2} m_{2y}^{(i)} \cdot c_{j,2y} \quad (13)$$

for i = 0, 1, and $$\hat{c}_j^{(i)} = \sum_{y=0}^{2} m_{0y}^{(i-2)} \cdot c_{j,2y} + \sum_{y=0}^{2} m_{1y}^{(i-2)} \cdot c_{j,1y} + \sum_{y=0}^{2} m_{2y}^{(i-2)} \cdot c_{j,0y} \quad (14)$$

for i = 2, 3.

Similarly to the previous embodiment, let $$M = \begin{bmatrix} m_{00}^{(0)} & m_{00}^{(1)} \\ m_{01}^{(0)} & m_{01}^{(1)} \\ m_{02}^{(0)} & m_{02}^{(1)} \\ m_{10}^{(0)} & m_{10}^{(1)} \\ m_{11}^{(0)} & m_{11}^{(1)} \\ m_{12}^{(0)} & m_{12}^{(1)} \\ m_{20}^{(0)} & m_{20}^{(1)} \\ m_{21}^{(0)} & m_{21}^{(1)} \\ m_{22}^{(0)} & m_{22}^{(1)} \end{bmatrix}, \quad (15)$$

denote a 9×2 matrix of the filter coefficients used in equations (13) and (14).

Let $$c_j^{odd} = [c_{j,00} \ c_{j,01} \ c_{j,02} \ c_{j,10} \ c_{j,11} \ c_{j,12} \ c_{j,20} \ c_{j,21} \ c_{j,22}], \quad (16)$$

$$C^{odd} = \begin{bmatrix} c_0^{odd} \\ c_1^{odd} \\ \vdots \\ c_{p/2-1}^{odd} \end{bmatrix}, \quad (17)$$

$$c_j^{even} = [c_{j,20} \ c_{j,21} \ c_{j,22} \ c_{j,10} \ c_{j,11} \ c_{j,12} \ c_{j,00} \ c_{j,01} \ c_{j,02}], \quad (18)$$

$$C^{even} = \begin{bmatrix} c_0^{even} \\ c_1^{even} \\ \vdots \\ c_{p/2-1}^{even} \end{bmatrix}, \quad (19)$$

and $$C = \begin{bmatrix} C^{odd} \\ C^{even} \end{bmatrix}, \quad (20)$$

and let input guide data $$r_j^{odd} = [d_j^{(0)} \ d_j^{(1)}], \quad (21)$$

$$R^{odd} = \begin{bmatrix} r_0^{odd} \\ r_1^{odd} \\ \vdots \\ r_{p/2-1}^{odd} \end{bmatrix}, \quad (22)$$

$$r_j^{even} = [d_j^{(2)} \ d_j^{(3)}], \quad (23)$$

$$R^{even} = \begin{bmatrix} r_0^{even} \\ r_1^{even} \\ \vdots \\ r_{p/2-1}^{even} \end{bmatrix}, \quad (24)$$

$$R = \begin{bmatrix} R^{odd} \\ R^{even} \end{bmatrix}. \quad (25)$$

Then, the estimated up-sampled pixels can be expressed as $$\hat{R} = CM, \quad (26)$$

and from equation (11) and equations (16-26) a solution M, optimum in the least squares sense, may be obtained via $$M = (C^T C)^{-1} C^T R. \quad (27)$$

General 3D Non-Separable Filter

In certain embodiments, at least one color component (e.g., the Y (Luma) component in YCbCr or the Green (G) component in RGB) may not undergo any down-sampling, thus preserving important edge-related information. The up-sampling process of the remaining color components (e.g., Cb and Cr in YCbCr) may be further improved if the 2D up-sampling filters described earlier are extended to become 3D filters as described herein.

Figure 6:
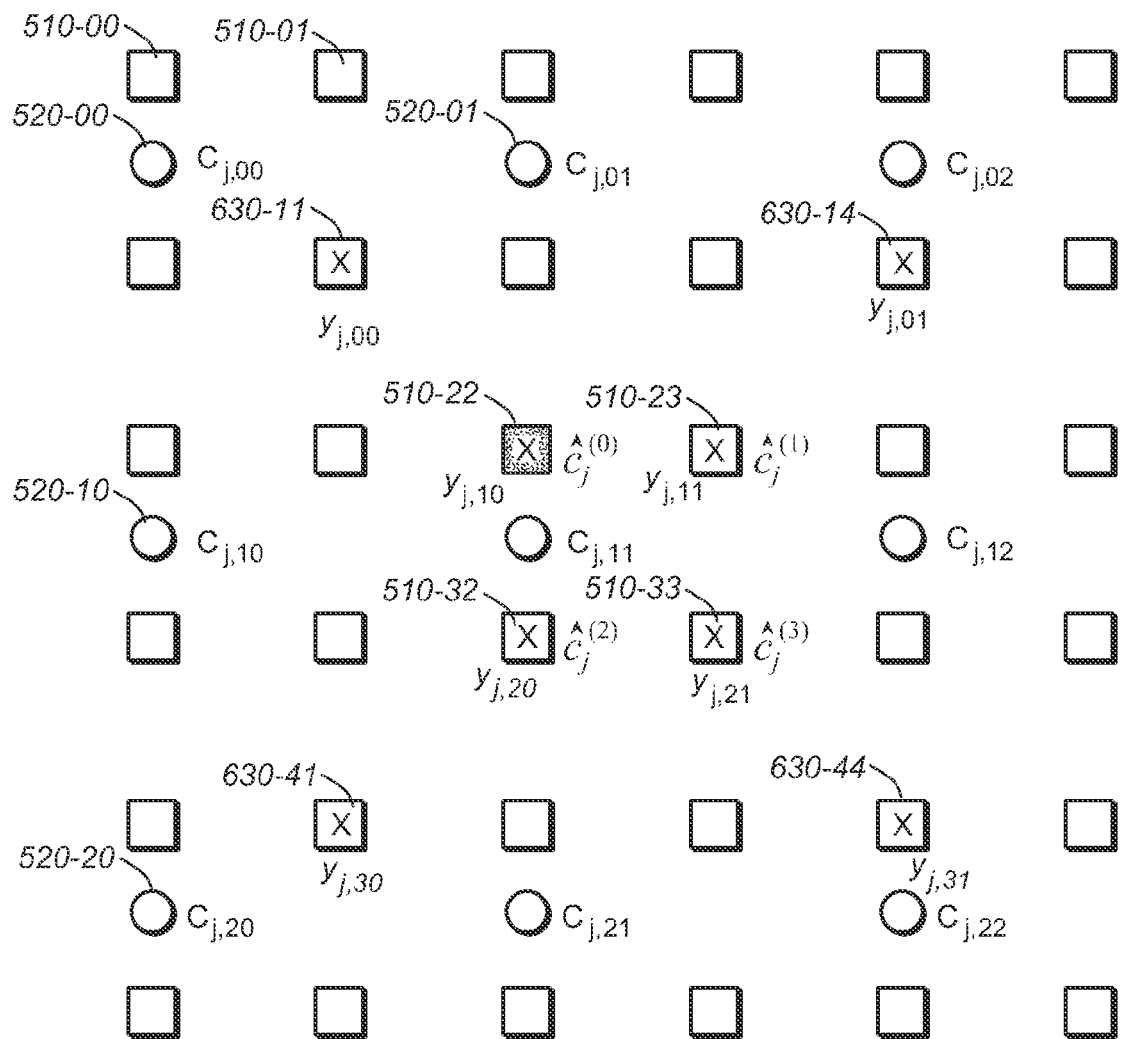
FIG. 6 depicts example input and output pixel arrays for up-sampling by a factor of two using a 3D filter according to an embodiment of the present invention.

FIG. 6 depicts example input and output pixels arrays for up-sampling by a factor of two by applying a 3D filter according to an embodiment of this invention. As before, denote as $c_j$ the input pixels of the color component to be up-sampled (e.g., Cb) and as $\hat{c}_j$ the predicted or up-sampled pixels. Denote as $y_j$ (630) pixels of the same guide image but from another color component available at full resolution (e.g., Y). In an embodiment, assuming without loss of generality that each up-sampled pixel is computed using a 3×3 2D filter on the input data ($c_j$) and a 4×2 filter on a separate component of the input guide data (e.g., the $y_j$ pixels), four new estimated pixels may be generated for each input pixel using a 3D filter described by:

$$\hat{c}_j^{(i)} = \left( \sum_{x=0}^{2} \sum_{y=0}^{2} m_{xy}^{(i)} \cdot c_{j,xy} \right) + \left( \sum_{x=0}^{3} \sum_{y=0}^{1} n_{xy}^{(i)} \cdot y_{j,xy} \right), \quad (28)$$

for $i = 0, 1, 2, 3$, where $m_{xy}^{(i)}$ and $n_{xy}^{(i)}$ denote the filter coefficients. These filter coefficients can be derived as before by solving an optimization problem $$\min_M \| R - \hat{R} \|^2, \quad (29)$$

where R is a matrix of guiding image data as defined in equation (6) and $$\hat{R} = CM, \quad (30)$$

where given $\overline{M}$ a 9×4 matrix with the $m_{xy}^{(i)}$ coefficients (similar to matrix denoted in equation (3)) and $\overline{N}$ a 8×4 matrix with the $n_{xy}^{(i)}$ coefficients, $$M = \begin{bmatrix} \overline{M} \\ \overline{N} \end{bmatrix}. \quad (31)$$

Matrix C represents the observed pixel data. Given $$c_j = [c_{j,00} \ c_{j,01} \ c_{j,02} \ c_{j,10} \ c_{j,11} \ c_{j,12} \ c_{j,20} \ c_{j,21} \ c_{j,22}], \quad (32)$$

$$\overline{C} = \begin{bmatrix} c_0 \\ c_1 \\ \vdots \\ c_{p-1} \end{bmatrix}, \quad (33)$$

$$y_j = [y_{j,00} \ y_{j,01} \ y_{j,10} \ y_{j,11} \ y_{j,20} \ y_{j,21} \ y_{j,30} \ y_{j,31}], \quad (34)$$

and

-continued $$Y = \begin{bmatrix} y_0 \\ y_1 \\ \vdots \\ y_{p-1} \end{bmatrix}, \quad (35)$$

then $$C = [\overline{C}\ \overline{Y}], \quad (36)$$

and as before, the optimal solution in the mean square sense may be defined by $$M = (C^T C)^{-1} C^T R. \quad (37)$$

Symmetric 3D Non-Separable Filter

The methods described earlier can easily be extended to embodiments that may apply 2D and 3D filters with different number of pixel coefficients and different up-sampling ratios.

As described in the 2D-filter case, in equation (28), the number of coefficients that need to be signaled to a decoder can be reduced if even and odd rows of the up-sampled image data are estimated using the same filter coefficients. In an embodiment, the prediction equations can be denoted as for i=0 and 1

$$\hat{c}_j^{(i)} = \quad (38)$$
$$\sum_{y=0}^{2} m_{0y}^{(i)} \cdot c_{j,0y} + \sum_{y=0}^{2} m_{1y}^{(i)} \cdot c_{j,1y} + \sum_{y=0}^{2} m_{2y}^{(i)} \cdot c_{j,2y} + \sum_{y=0}^{2} n_{0y}^{(i-2)} \cdot y_{j,0y} +$$
$$\sum_{y=0}^{1} n_{1y}^{(i-2)} \cdot y_{j,1y} + \sum_{y=0}^{1} n_{2y}^{(i-2)} \cdot y_{j,2y} + \sum_{y=0}^{1} n_{3y}^{(i-2)} \cdot y_{j,3y}$$

for i=2 and 3

$$\hat{c}_j^{(i)} = \sum_{y=0}^{2} m_{0y}^{(i-2)} \cdot c_{j,2y} + \sum_{y=0}^{2} m_{1y}^{(i-2)} \cdot c_{j,1y} + \quad (39)$$
$$\sum_{y=0}^{2} m_{2y}^{(i-2)} \cdot c_{j,0y} + \sum_{y=0}^{1} n_{0y}^{(i-2)} \cdot y_{j,3y} +$$
$$\sum_{y=0}^{1} n_{1y}^{(i-2)} \cdot y_{j,2y} + \sum_{y=0}^{1} n_{2y}^{(i-2)} \cdot y_{j,1y} + \sum_{y=0}^{1} n_{3y}^{(i-2)} \cdot y_{j,0y}$$

Using equations (38) and (39) and the same methodology as applied earlier, optimum filter coefficients $m_{xy}^{(i)}$ and $n_{xy}^{(i)}$ can be derived.

Example Process for Guided Up-Sampling

Figure 7:
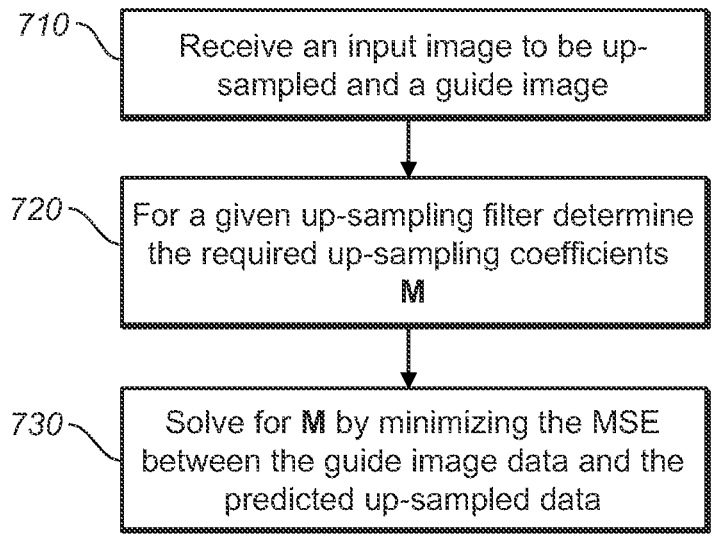
FIG. 7 depicts an example process for guided image up-sampling according to an embodiment of the present invention.

FIG. 7 shows an example process for guided image up-sampling according to an example implementation of this invention. The process starts at step 710, wherein an up-sampling processor, such as processors 150, 320, or 420, receives an input image to be up-sampled (e.g., images 143, 312, or 412) and an input guide image (e.g., inputs 112, 305, or 405), wherein the guide image has a spatial resolution higher than the spatial resolution of the input image. Given these two inputs, in step 720 an up-sampling filter is determined (e.g. a general 2D non-separable filter or a symmetric 3D non-separable filter). The up-sampling filter may be fixed and known by both the encoder and the decoder, or as described earlier, the up-sampling process may select a filter among a variety of up-sampling filters, including (but not necessarily limited to): 1D up-sampling filters, general 2D up-sampling filters, symmetric 2D up-sampling filters, general 3D up-sampling filters, or symmetric 3D up-sampling filters. The selection of the up-sampling filter may be performed using a variety of methods that may take into considerations a number of criteria, including available computational and memory resources, the MSE prediction error using a particular filter, and target coding efficiency.

Given the up-sampling filter model, a set of filter coefficients, M, may be derived, according to a pre-defined optimization criterion. For example, under the MSE criterion, optimum solutions for M may be derived using MSE optimization techniques as those described herein which minimize the MSE between the guide image samples and the predicted samples of the up-sampled image.

After solving for the filter coefficients M, in some embodiments, the coefficients and (optionally) the identity of the up-sampling filter may be transmitted to a receiver, e.g., as metadata.

Up-sampling process 700 may be repeated at a variety of intervals as deemed necessary to maintain coding efficiency while using available computing resources. For example, when coding video signals, process 700 can be repeated for each frame, a group of frames, a part of frame, or whenever the prediction residual between guide images and up-sampled images exceeds a particular threshold.

Guided Color Transient Improvement (CTI) Filtering

As used herein, the term "color transient artifacts" denotes color-related artifacts in image or video processing. For example, in video and image coding one may recognize such artifacts by the presence of false colors in a decoded image (e.g., across the edges of an object). Such artifacts may also be referred to as "color bleeding." Color transient artifacts may occur when each color plane of an image is processed separately using different levels of compression. For example, in an RGB image, the Red and Blue planes may be quantized differently than the Green plane. Similarly, in a YCbCr image, the Cb and Cr planes may be processed differently than the Y plane.

One approach to reduce color transients artifacts is to apply post-processing filtering to the chroma or secondary color components of the decoded image. Similarly to the guided up-sampling process described earlier, guided CTI filtering derives optimum filtering coefficients in the encoder and transmits them as metadata to the decoder. Furthermore, filtering of a pixel in a color plane (e.g., Cb in YCbCr or B in RGB) may take into consideration both neighbor pixels in the same color plane and neighbor pixels of a corresponding pixel in another color plane (e.g., the luminance, Y, plane in YCbCr or G in RGB).

In an embodiment, optimal filter coefficients may be derived in the encoder based on the original, uncompressed, data. The filter coefficients may be estimated on a per block, frame, or scene basis, depending on available resources and bandwidth. On the decoder, the filter may be applied as a post-processing (out-of-loop) filter to improve overall picture quality.

Example Derivation of Filter Coefficients in a CTI Filter

Denote as $c_{ij}$ the input pixels of an image color component (e.g., Cb, Cr, R, or B) to be filtered using a CTI filter, and as $\hat{c}_{ij}$ the output filtered pixels. Denote as $y_{ij}$ pixels of the same image to be filtered but from a second color component (e.g., luma Y or G). In an embodiment, assuming without loss of generality that each color pixel is filtered using a generalized 3D filter that applies a (2N+1)×(2N+1) kernel for the first color component and a (2M+1)×(2M+1) kernel for the second color component (e.g. 3×3 and 3×3 when N=M=1), then the filtered output may be denoted as:

$$\hat{c}_{ij} = \left(\sum_{x=-N}^{N}\sum_{y=-N}^{N} m_{xy} \cdot c_{(i-x)(j-y)}\right) + \left(\sum_{x=-M}^{M}\sum_{y=-M}^{M} n_{xy} \cdot y_{(i-x)(j-y)}\right), \quad (40)$$

where $m_{xy}$ and $n_{xy}$ denote the filter coefficients.

One may recognize that equation (40) is very similar to the generalized 3D up-sampling filter described by equation (28); hence filter coefficients in equation (40) may be derived as before by solving the optimization problem $$\min_{\{m_{xy}\},\{n_{xy}\}} \sum_{j}^{p-1} |d_{ij} - \hat{c}_{ij}|^2, \quad (41)$$

where $d_{ij}$ denotes the pixels of a reference or guide image (e.g., input V 105).

As before, equation (40) may be expressed in a matrix form as $$\hat{R} = CM, \quad (42)$$

and the solution to equation (41) can be expressed as an optimization problem $$\min_{M} \|R - \hat{R}\|^2, \quad (43)$$

where R represents a vector comprising the guide image data ($d_{ij}$), $\overline{M}$ is a $(2N+1)^2 \times 1$ vector with the $m_{xy}$ coefficients, and $\overline{N}$ is a $(2M+1)^2 \times 1$ vector with the $n_{xy}$ coefficients, so that $$M = \left[\frac{\overline{M}}{\overline{N}}\right]. \quad (44)$$

Matrix C represents the observed pixel data ($c_{ij}$ and $y_{ij}$)

$$C = [\overline{C} \overline{Y}]. \quad (45)$$

As described earlier, the optimal solution of equation (43) in the mean square sense may be expressed as $$M = (C^T C)^{-1} C^T R. \quad (46)$$

The process may be repeated for each of the color components that require CIT filtering (e.g., Cb and Cr or R and B).

Figure 8:
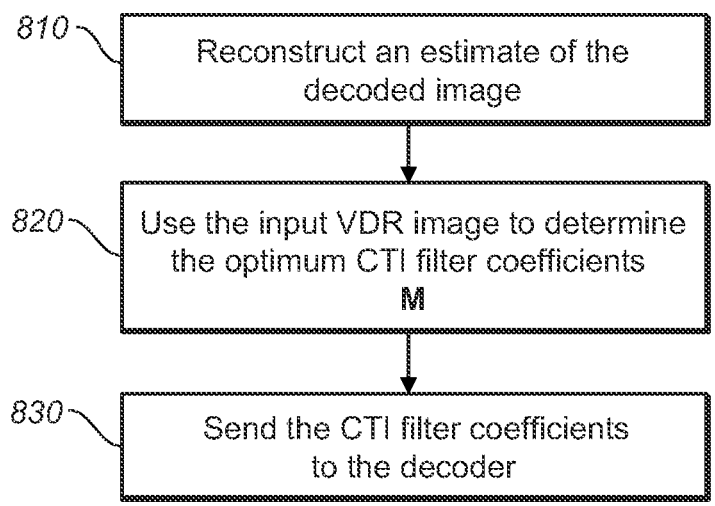
FIG. 8 depicts an example process for guided color transient improvement filtering according to an embodiment of the present invention.

FIG. 8 depicts an example process for guided color transient improvement filtering according to an embodiment of the present invention. In step 810, the encoder (e.g., system 100 depicted in FIG. 1) may first reconstruct an estimate of the decoded image (e.g., V 270) as it will be received by the receiver (e.g., system 200 depicted in FIG. 2). For example, the reconstructed picture on the decoder (e.g., 270) may be estimated by adding the output of the predictor 160 (e.g., signal 165) to a coded and then decoded version of the residual 175.

In step 820, using equation (46), with R based on input V 105, the encoder may derive the optimum CTI filter coefficients M. In step 830, these coefficients and other filtering parameters may be transmitted to the decoder as part of the metadata bit stream. On the decoder, after reconstructing signal V 270, a separate post-processing process may apply a CTI filter to signal V 270 to improve overall quality by reducing color-related artifacts.

Process 800 may be repeated at a variety of intervals as deemed necessary to maintain coding efficiency while using available computing resources. For example, when coding video signals, process 800 may be repeated for each frame, a group of frames, a part of frame, or whenever the prediction residual between guide images and CTI filtered images exceeds a particular threshold. Process 800 may also be repeated for each of the color components that may require CTI filtering.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to guided up-sampling or CTI filtering, such as those described herein. The computer and/or IC may compute any of a variety of parameters or values that relate to guided image up-sampling as described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement guided image up-sampling or CTI filtering methods as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to guided image up-sampling and CTI filtering are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

receiving a first image of a first spatial resolution and a guide image of a second spatial resolution, wherein both the first image and the guide image represent similar scenes and the second spatial resolution is higher than the first spatial resolution, wherein the first image comprises a first color component and a second color component;

selecting an up-scaling filter to up-scale the first image to a third image with a spatial resolution equal to the second spatial resolution;

computing filtering coefficients for the up-scaling filter wherein the filtering coefficient computation is based, at least in part, on minimizing an error measurement between pixel values of the guide image and the third image, wherein the up-scaling filter comprises a first set of filtering coefficients and a second set of filtering coefficients, wherein generating the third image comprises combining the result of filtering the first color component of the first image with the first set of filtering coefficients with the result of filtering the second color component of the first image with the second set of filtering coefficients; and transmitting the filtering coefficients to a decoder.

2. The method of claim 1 further comprising outputting the third image.

3. The method of claim 1 wherein the up-scaling filter to up-scale the first image is selected from among a plurality of available filters.

4. The method of claim 3 wherein the plurality of available filters comprises a general 2D filter, a symmetric 2D filter, a general 3D filter, and a symmetric 3D filter.

5. The method of claim 3 further comprising signaling to the decoder an identity of the up-scaling filter being selected among the plurality of available up-scaling filters.

6. The method of claim 1 wherein the error measurement comprises a mean square error (MSE) computation.

7. The method of claim 1 wherein the first color component of the first image is a luminance (Y) component and the second color component of the first image is a chroma (Cb or Cr) color component.

8. The method of claim 1 wherein the first color component of the first image is a Green (G) component and the second color component of the first image is a Red (R) or Blue (B) color component.

9. The method of claim 1 wherein the first color component of the first image has a first spatial resolution and the second color component of the first image has a second spatial resolution, wherein the first spatial resolution of the first color component is higher than the second spatial resolution of the second color component.

10. The method of claim 1 wherein the first image is in a YCbCr 4:2:0 color format and the guide image is in YCbCr 4:4:4 color format.

11. The method of claim 1 wherein the first image is in RGB 4:2:0 color format and the guide image is in RGB 4:4:4 color format.

12. The method of claim 1 wherein the first image comprises at least one color component of a standard dynamic range (SDR) image and the guide image comprises at least one color component of a video dynamic range image (VDR).

13. The method of claim 1 wherein the first image comprises at least one chroma component of an enhancement layer image in YCbCr 4:2:0 format and the guide image comprises at least the same chroma component of the enhancement layer image in YCbCr 4:4:4 format.

14. A method to decode an image with a decoder, the method comprising:

receiving a first image that has a first spatial resolution, wherein the first image comprises a first color component and a second color component;

receiving, from an encoder, filtering coefficients for up-sampling the first image to a second image that has a second spatial resolution, wherein the second spatial resolution is higher than the first spatial resolution, and the filtering coefficients comprise a first set of filtering coefficients and a second set of filtering coefficients; and generating the second image by combining the result of filtering the first color component of the first image with the first set of filtering coefficients with the result of filtering the second color component of the first image with the second set of filtering coefficients, wherein the encoder generated the filtering coefficients based on minimizing an error measurement between pixel values of a guide image and pixel values of encoder version of the second image having the second spatial resolution and the encoder version of the second image is generated in the encoder by up-sampling encoder version of the first image, wherein the guide image represents the same scene as the first image and has a spatial resolution that matches the second spatial resolution.

* * * * *